United States Patent
Zeng et al.

(10) Patent No.: US 12,447,894 B2
(45) Date of Patent: Oct. 21, 2025

(54) SIDE WINDOW ENCAPSULATION, SIDE WINDOW ENCAPSULATION ASSEMBLY, AND VEHICLE

(71) Applicant: FUYAO GLASS INDUSTRY GROUP CO., LTD., Fuqing Fuzhou (CN)

(72) Inventors: Dong Zeng, Fuqing (CN); Hua Chen, Fuqing (CN); Ke Zhang, Fuqing (CN); Xiuyong Ou, Fuqing (CN); Changhe Yu, Fuqing (CN); Qiming Lin, Fuqing (CN); Ronglin Chen, Fuqing (CN)

(73) Assignee: FUYAO GLASS INDUSTRY GROUP CO., LTD., Fuqing Fuzhou (CN)

( * ) Notice: Subject to any disclaimer, the term of this patent is extended or adjusted under 35 U.S.C. 154(b) by 0 days.

(21) Appl. No.: 18/693,712

(22) PCT Filed: Sep. 21, 2022

(86) PCT No.: PCT/CN2022/120069
§ 371 (c)(1),
(2) Date: Mar. 20, 2024

(87) PCT Pub. No.: WO2023/045938
PCT Pub. Date: Mar. 30, 2023

(65) Prior Publication Data
US 2024/0375577 A1 Nov. 14, 2024

(30) Foreign Application Priority Data
Sep. 22, 2021 (CN) .......................... 202111106716.6

(51) Int. Cl.
*B60Q 1/26* (2006.01)
*B60J 1/10* (2006.01)

(52) U.S. Cl.
CPC ................ *B60Q 1/268* (2013.01); *B60J 1/10* (2013.01)

(58) Field of Classification Search
CPC ...... B60Q 1/268; B60Q 3/208; B60Q 1/2626; B60Q 1/2649; B60Q 1/32; B60J 10/70;
(Continued)

(56) References Cited

U.S. PATENT DOCUMENTS 5,839,231 A * 11/1998 Gebhart ................. B60J 1/1853
49/413
2004/0252514 A1 12/2004 Okabe et al.
(Continued)

FOREIGN PATENT DOCUMENTS

| CN | 104149706 A | 11/2014 |
| CN | 104354570 A | 2/2015 |

(Continued)

OTHER PUBLICATIONS

PCT International Search Report and Written Opinion (with English translations) for corresponding PCT Application No. PCT/CN2022/120069, mailed Dec. 13, 2022, 15 pages.
(Continued)

*Primary Examiner* — Omar Rojas Cadima
(74) *Attorney, Agent, or Firm* — Dority & Manning, PA

(57) ABSTRACT

A side window encapsulation includes: a light group assembly and an encapsulation frame. The encapsulation frame defines a mounting opening for receiving glass. The side surface of the encapsulation frame facing away from the interior of the vehicle is an outer side surface. A mounting groove is formed on the outer side surface of the encapsulation frame. The light group assembly is detachably mounted in the mounting groove. An insertion part and an engaging part are respectively provided on two opposite side walls of the mounting groove. An insertion-fitting part is provided on the light group assembly and at positions corresponding to the insertion part. The insertion-fitting part is detachably inserted in the insertion part. A fastening
(Continued)

member is provided on the light group assembly and at positions corresponding to the engaging part. The fastening member is detachably engaged with the engaging part.

13 Claims, 11 Drawing Sheets

(58) Field of Classification Search
CPC ......... B60J 1/10; B60J 1/20; B60J 1/08; B60J 10/84; B60J 10/45; B60R 13/04
See application file for complete search history.

(56) References Cited

U.S. PATENT DOCUMENTS

| | | | |
|---|---|---|---|
| 2016/0200241 A1* | 7/2016 | Snider | B60Q 3/30 362/520 |
| 2018/0118096 A1* | 5/2018 | Beach | B32B 17/10036 |

FOREIGN PATENT DOCUMENTS

| | | |
|---|---|---|
| CN | 207374068 U | 5/2018 |
| CN | 209719405 U | 12/2019 |
| CN | 209795369 U | 12/2019 |
| CN | 111231855 A | 6/2020 |
| CN | 210912278 U | 7/2020 |
| CN | 111674339 A | 9/2020 |
| CN | 213920840 U | 8/2021 |
| CN | 113696819 A | 11/2021 |
| DE | 102019208465 A1 | 12/2020 |
| EP | 3047992 A1 | 7/2016 |
| EP | 2737247 B1 | 7/2019 |
| EP | 2900499 B1 | 3/2020 |
| FR | 3012393 A1 | 5/2015 |

OTHER PUBLICATIONS

Chinese Office Action for corresponding CN Application No. 202111106716.6, dated Jun. 17, 2022, 6 pages.
Extended European Search Report for corresponding Application No. 22871984.5, dated Oct. 11, 2024, 26 pages.

* cited by examiner

SIDE WINDOW ENCAPSULATION, SIDE WINDOW ENCAPSULATION ASSEMBLY, AND VEHICLE

CROSS-REFERENCE TO RELATED APPLICATIONS

This application is the national phase under 35 U.S.C. § 371 of PCT International Application No. PCT/CN2022/120069, which has an international filing date of Sep. 21, 2022 and claims priority to Chinese patent application No. 2021111067166, entitled "SIDE WINDOW ENCAPSULATION, SIDE WINDOW ENCAPSULATION ASSEMBLY, AND VEHICLE", filed on Sep. 22, 2021, the disclosure of which is hereby incorporated by reference in its entirety.

TECHNICAL FIELD

The present disclosure relates to the technical field of vehicle parts, and in particular, to a side window encapsulation, a side window encapsulation assembly, and a vehicle.

BACKGROUND

With the improvement of people's living standard, users have certain requirements for the decoration effect and visual effect inside and outside the vehicle besides the basic performance. Based on this fact, with the development in the field of vehicle parts, a scheme of arranging light groups around side window glasses is designed after research. Based on the fact that the light groups can emit light autonomously under any lighting conditions and is not affected by ambient light, resulting in a wide range of applications. On the other hand, the light groups are arranged around the side window glasses can make full use of the space around the glasses and improve the space utilization rate. Since the light groups are arranged around the side window glasses, there are problems of inconvenient operation and high maintenance cost when the light groups are replaced or repaired.

SUMMARY

According to various embodiments of the present disclosure, a side window encapsulation, a side window encapsulation assembly, and a vehicle are provided, so as to effectively improve the convenience of operation and reduce the maintenance cost.

A side window encapsulation includes:
a light group assembly; and
an encapsulation frame, wherein the encapsulation frame encloses a mounting opening configured for receiving a glass; a side surface of the encapsulation frame facing away from an interior of a vehicle is an outer side surface; a mounting groove is disposed on the outer side surface of the encapsulation frame; the light group assembly is removably mounted in the mounting groove; and an insertion part and an engaging part are respectively disposed on two opposite sidewalls of the mounting groove.

An insertion fitting part is disposed at a portion of the light group assembly corresponding to the insertion part. One of the insertion fitting part and the insertion part is removably inserted in another one of the insertion fitting part and the insertion part.

A fastening member is disposed at a portion of the light group assembly corresponding to the engaging part. The fastening member is removably engaged in the engaging part.

In an embodiment, a sidewall of the mounting groove provided with the insertion part is a first sidewall, a sidewall of the mounting groove provided with the engaging part is a second sidewall; the first sidewall and the second sidewall are arranged sequentially in a direction away from the mounting opening. The second sidewall is located at an outer rim of the encapsulation frame. The engaging part includes an engaging hole disposed on the second sidewall. The fastening member is removably engaged in the engaging hole. The engaging hole extends through the encapsulation frame in the direction away from the mounting opening.

In an embodiment, the side window encapsulation further includes a decorative member. The decorative member is disposed outside the encapsulation frame. The decorative member shields a side of the engaging hole facing away from the mounting opening.

In an embodiment, a plurality of insertion parts are disposed on the first sidewall. The plurality of insertion parts are arranged at intervals in a length direction of the first sidewall.

A plurality of engaging holes are disposed on the second sidewall. The plurality of engaging holes are arranged at intervals in a length direction of the second sidewall. The decorative member is a strip plate. A length direction of the decorative member is parallel to the length direction of the second sidewall. The decorative member shields a side of each of the engaging holes facing away from the mounting opening.

In an embodiment, the encapsulation frame is capable of being integrally connected with the glass by an injection of a flexible plastic material. The side window encapsulation further includes a bright strip. The bright strip is disposed on a side of the light group assembly facing away from a bottom wall of the mounting groove. One side edge of two opposite side edges of the bright strip abuts against the flexible plastic material, another side edge of the two opposite side edges of the bright strip abuts against a long edge of the decorative member, and another long edge of the decorative member is located on a side of the encapsulation frame facing the interior of the vehicle.

In an embodiment, the bright strip is adhered or engaged to the light group assembly.

In an embodiment, a first connecting through hole is disposed on the second sidewall. A second connecting through hole is formed at a portion of the light group assembly corresponding to the first connecting through hole. The side window encapsulation further includes a first connecting member. The first connecting member extends through the first connecting through hole and the second connecting through hole to connect the light group assembly and the encapsulation frame. The decorative member shields a side of the first connecting member facing away from the mounting opening.

In an embodiment, the side window encapsulation further includes a second connecting member. A third connecting through hole is disposed on the decorative member. A fourth connecting through hole or a connecting groove is disposed at a portion of the encapsulation frame corresponding to the third connecting through hole. The second connecting member extends through the third connecting through hole and is inserted into the fourth connecting through hole or the connecting groove to connect the decorative member and the encapsulation frame.

In an embodiment, when applied to a vehicle, a front side of the mounting opening is a side where a vehicle head is located. The mounting groove is located at a rear side of the mounting opening.

A side window encapsulation assembly includes a glass and the above side window encapsulation. The glass is mounted in the mounting opening.

In an embodiment, the glass is integrally connected with the encapsulation frame.

In an embodiment, the insertion part includes an inserting hole disposed on a sidewall of the mounting groove. The insertion fitting part includes a positioning protrusion disposed on the light group assembly. The positioning protrusion is removably inserted into the inserting hole. A portion of the positioning protrusion inserted into the inserting hole is located on a side of the glass facing the interior of the vehicle.

In an embodiment, the insertion part includes a convex structure disposed on a sidewall of the mounting groove. The insertion fitting part includes a concave structure disposed on the light group assembly. The convex structure is removably inserted into the concave structure.

A vehicle includes the above side window encapsulation assembly.

BRIEF DESCRIPTION OF THE DRAWINGS

In order to illustrate the technical solutions more clearly in the embodiments of the present disclosure, a brief description is given below for the drawings referred in the description of the embodiments. Obviously, the drawings in the following description illustrates merely some embodiments of the disclosure. For those of ordinary skill in the art, other drawings can also be obtained based on these drawings without involving any inventive effort.

Figure 1:
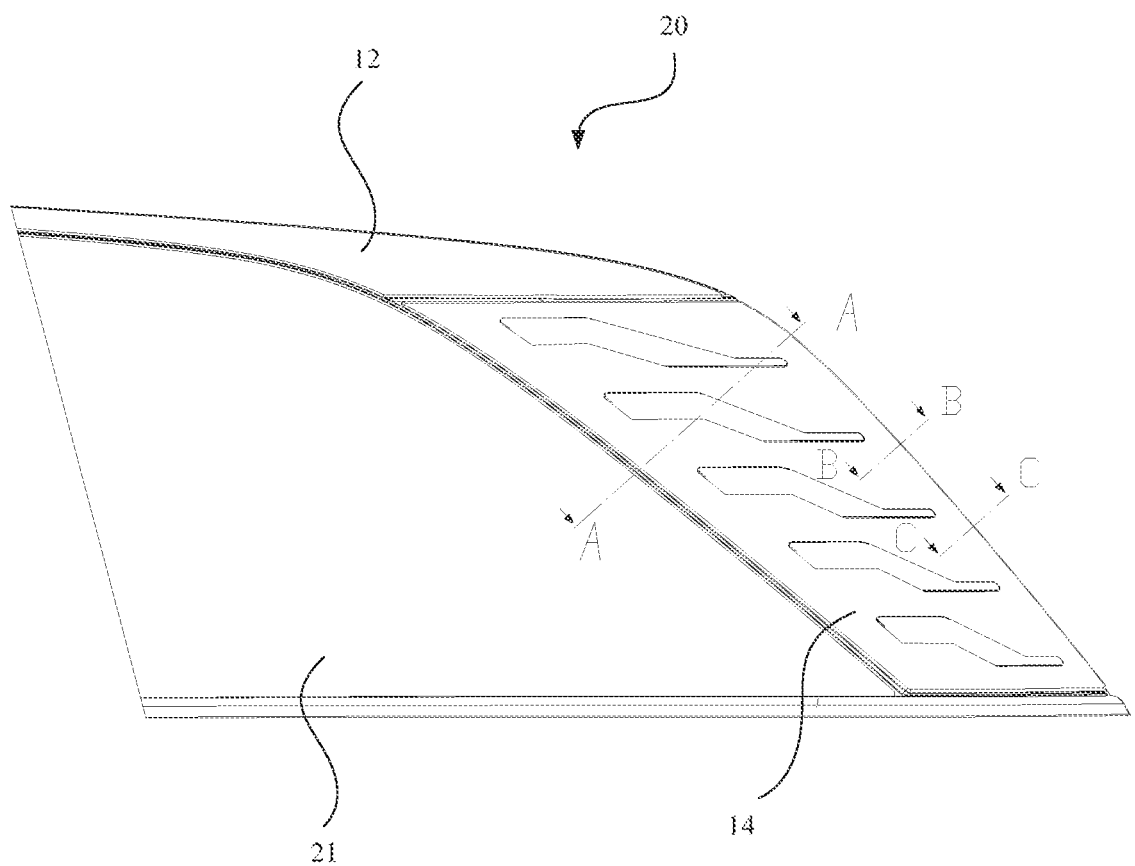
FIG. 1 is a front view of a side window encapsulation assembly according to an embodiment.

ILLUSTRATION FOR REFERENCE NUMERALS 10. side window encapsulation; 11. light group assembly; 111. insertion fitting part; 112. fastening member; 113. second connecting through hole; 12. encapsulation frame; 121. mounting opening; 122. mounting groove; 1221. first sidewall; 1222. second sidewall; 123. insertion part; 124. engaging part; 125. first connecting through hole; 126. connecting groove; 13. decorative member; 131. third connecting through hole; 14. bright strip; 15. first connecting member; 16. second connecting member; 17. flexible plastic material; 20. side window encapsulation assembly; 21. glass; 30. side enclosing sheet metal; 40. drainage channel sheet metal.

DETAILED DESCRIPTION

In order to make the objects, features, and advantages of the present disclosure more apparent and understandable, the specific implementations of the present disclosure will be illustrated in detail below in conjunction with the accompanying drawings. In the following description, numerous specific details are set forth in order to facilitate a thorough understanding of the present disclosure. However, the present disclosure can be implemented in many other ways different from those described herein, and those skilled in the art can make similar modifications without departing from the spirit of the present disclosure, so that the present disclosure is not limited to the specific embodiments disclosed below.

Figure 2:
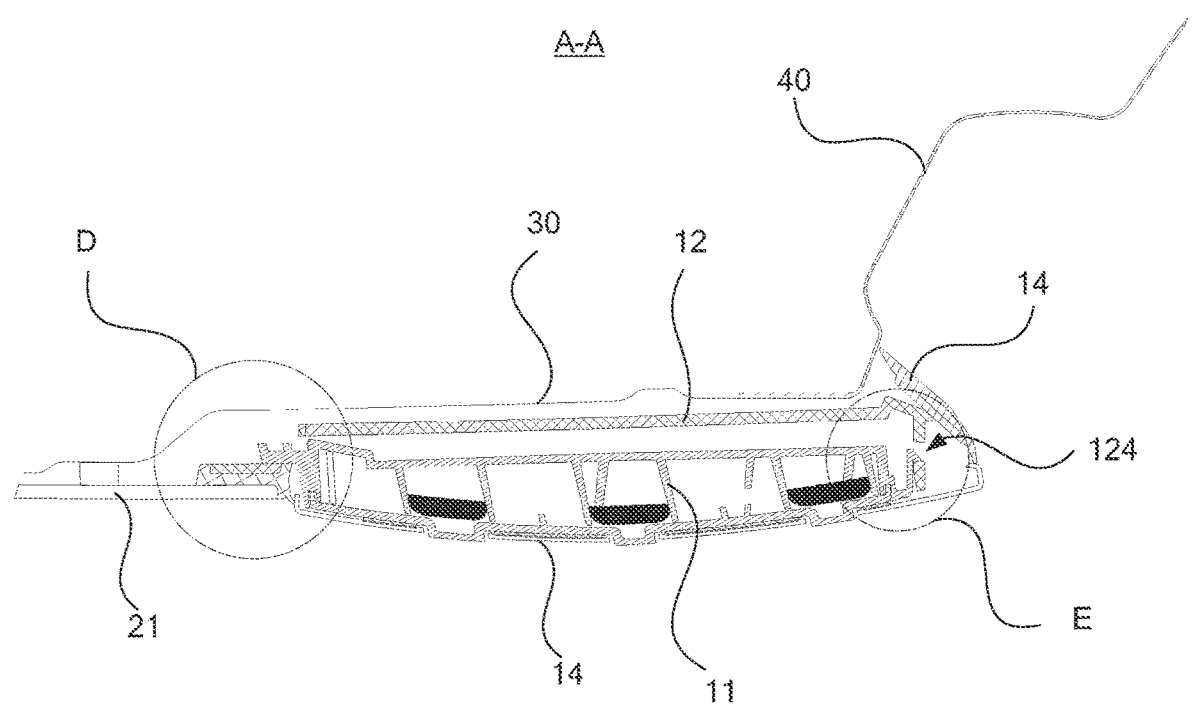
FIG. 2 is a sectional view taken along a line A-A in FIG. 1.
Figure 8:
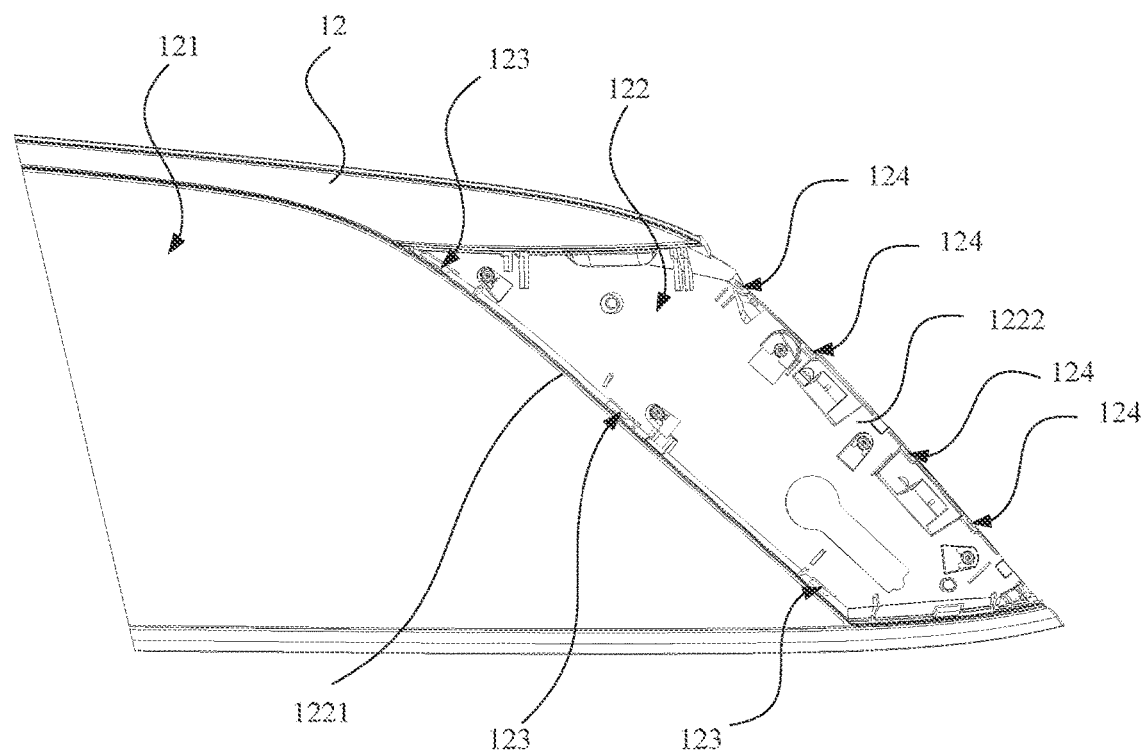
FIG. 8 is a front view of an encapsulation frame according to an embodiment.
Figure 10:
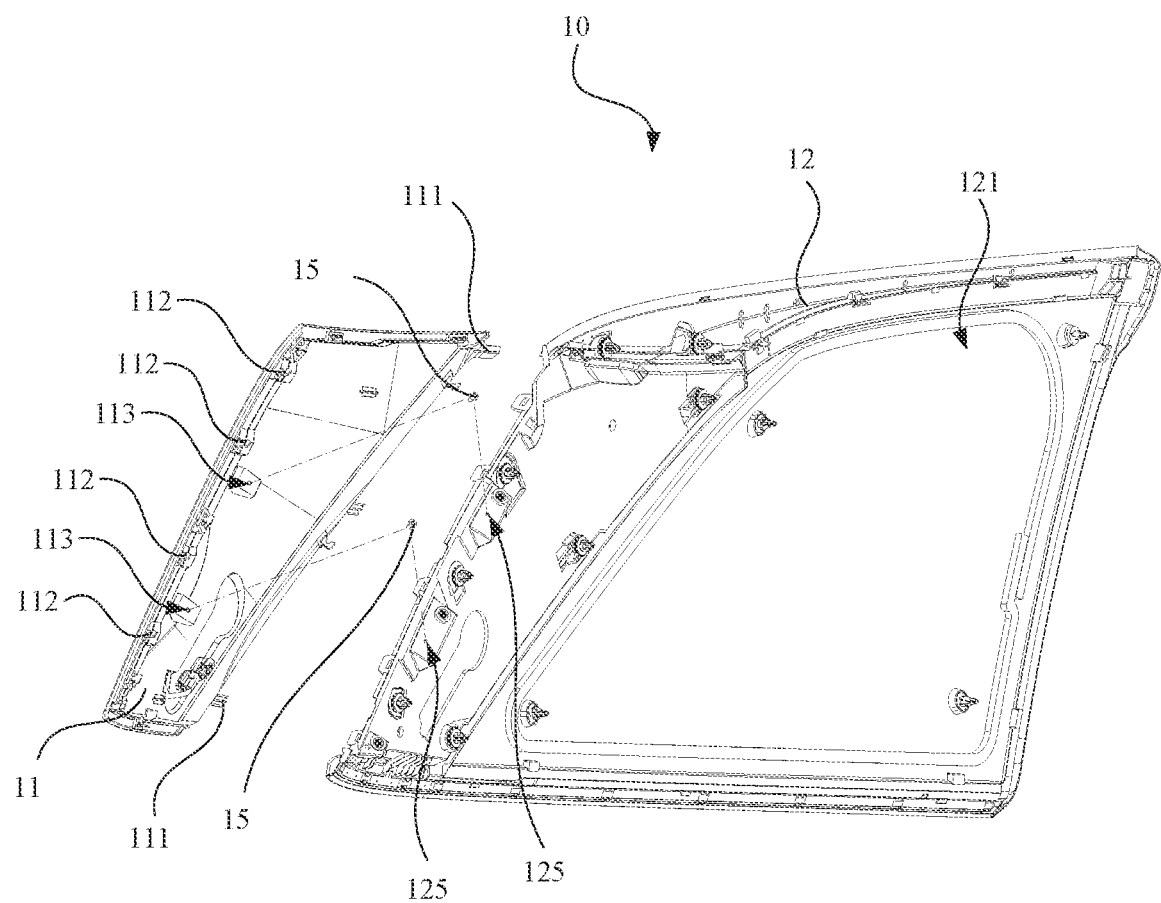
FIG. 10 is an exploded view of a side window encapsulation according to an embodiment.

As shown in FIGS. 1, 2, 8 and 10, in an embodiment, a side window encapsulation 10 is provided, which includes:
a light group assembly 11; and
an encapsulation frame 12 enclosing a mounting opening 121 configured for receiving a glass 21. As shown in FIG. 8, a side surface of the encapsulation frame 12 facing away from an interior of a vehicle is an outer side surface, and a mounting groove 122 is disposed on the outer side surface of the encapsulation frame 12. As shown in FIGS. 1, 2 and 10, the light group assembly 11 is removably mounted in the mounting groove 122. An insertion part 123 and an engaging part 124 are respectively provided on two opposite sidewalls of the mounting groove 122.

As shown in FIGS. 2 to 4 and FIG. 9, an insertion fitting part 111 is provided on the light group assembly 11 at a position corresponding to the insertion part 123. One of the insertion fitting part 111 and the insertion part 123 is removably inserted into the other one.

A fastening member 112 is disposed on a portion of the light group assembly 11 corresponding to the engaging part 124. The fastening member 112 and the engaging part 124 are removably engaged with each other.

According to the side window encapsulation 10 according to the above embodiment, the insertion part 123 and the engaging part 124 are respectively provided on the two opposite sidewalls of the mounting groove 122, so that the light group assembly 11 can be removably mounted in the mounting groove 122. When the light group assembly 11 needs to be replaced or maintained, the light group assembly 11 can be removed from the encapsulation frame 12, thereby improving the convenience of operation and reducing the maintenance cost. In the assembling process, the insertion fitting part 111 and the insertion part 123 are firstly coupled to each other, and then the light group assembly 11 is pressed into the mounting groove 122 until the fastening member 112 and the engaging part 124 are engaged with each other. When it is necessary to disassemble, the fastening member 112 and the engaging part 124 are detached from each other firstly, and then the light group assembly 11 is removed from the mounting groove 122.

Figure 3:
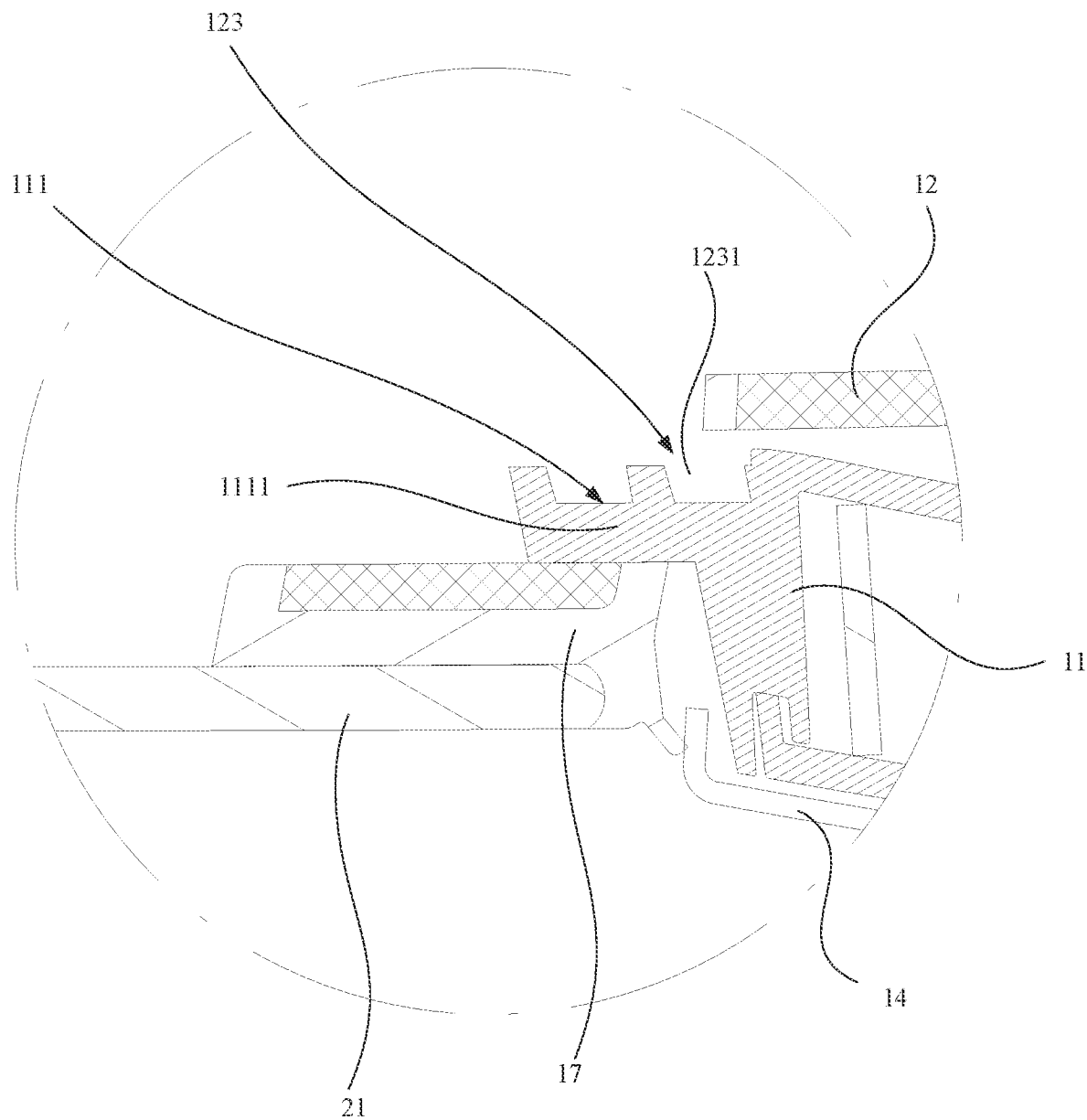
FIG. 3 is a partial enlarged view of a portion D in FIG. 2.

In an embodiment, as shown in FIGS. 2 and 3, the insertion part 123 includes an inserting hole 1231 disposed on a sidewall of the mounting groove 122. The insertion fitting part 111 includes a positioning protrusion 1111 disposed on the light group assembly 11. The positioning protrusion 1111 can be removably inserted into the inserting hole 1231.

Alternatively, in another embodiment, the insertion part 123 can include a convex structure disposed on a sidewall of the mounting groove 122. The insertion fitting part 111 includes a concave structure disposed on the light group assembly 11. The convex structure can be removably inserted into the concave structure.

Figure 4:
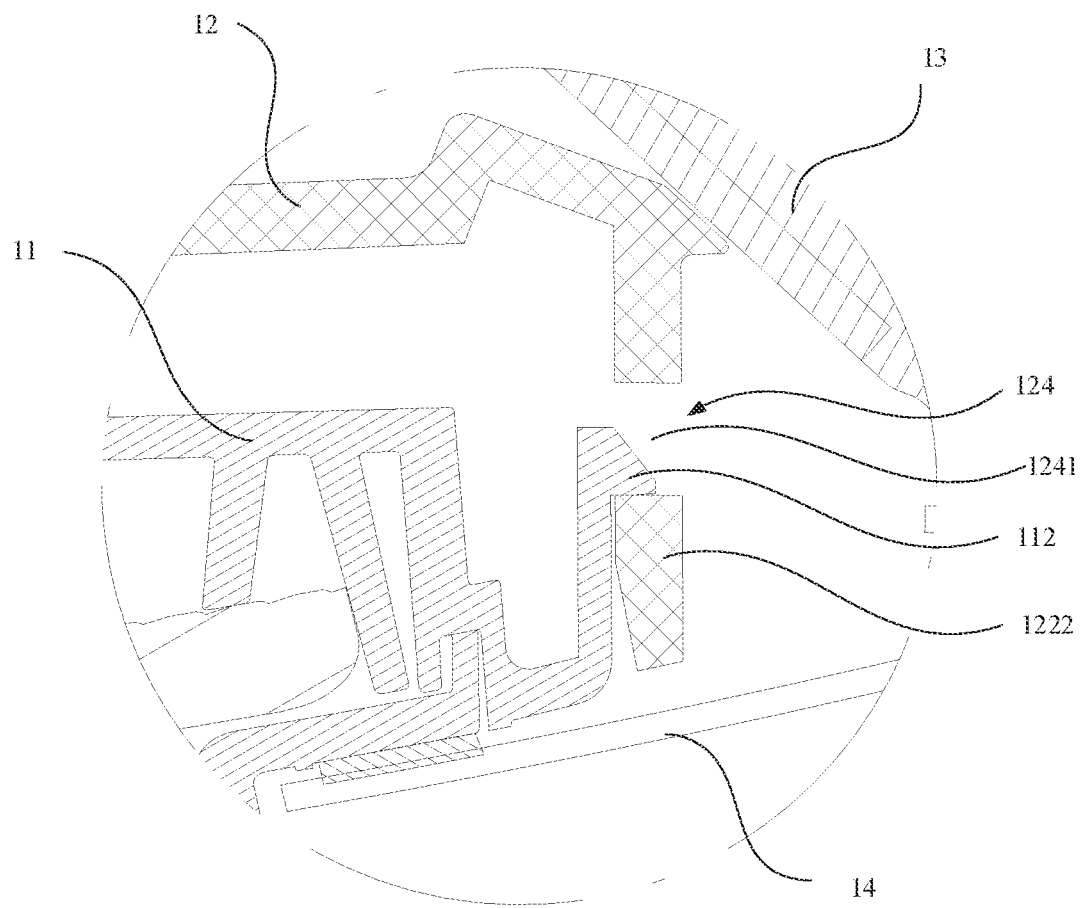
FIG. 4 is a partial enlarged view of a portion E in FIG. 2.
Figure 5:
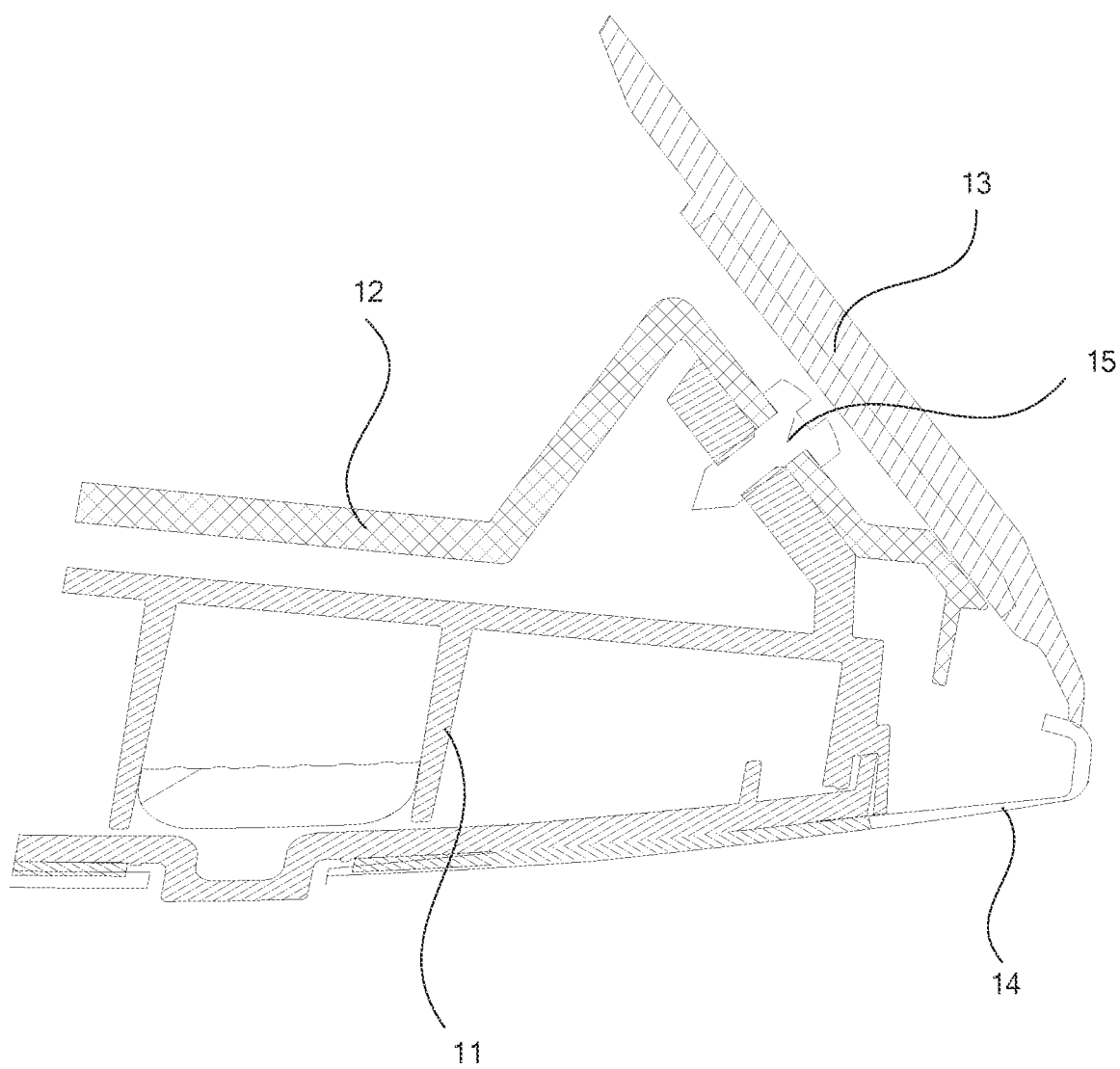
FIG. 5 is a sectional view taken along a line B-B in FIG. 1.

Further, in an embodiment, as shown in FIGS. 2 and 4, the engaging part 124 includes an engaging hole 1241 disposed on a sidewall of the mounting groove 122. The fastening member 112 can be removably engaged in the engaging hole 1241.

Further, in an embodiment, as shown in FIG. 8, the sidewall of the mounting groove 122 provided with the insertion part 123 is a first sidewall 1221. The sidewall of the mounting groove 122 provided with the engaging part 124 is a second sidewall 1222. The first sidewall 1221 and the second sidewall 1222 are arranged sequentially in a direction away from the mounting opening 121. The second sidewall 1222 is located at an outer rim of the encapsulation frame 12. As shown in FIGS. 2 and 4, the engaging hole 1241 is formed on the second sidewall 1222. The engaging hole 1241 extends through the encapsulation frame 12 in the direction away from the mounting opening 121.

Thus, as shown in FIGS. 2 and 4, when the light group assembly 11 is mounted in the mounting groove 122, the fastening member 112 can be pushed from an outside of the encapsulation frame 12, so as to remove the light group assembly 11 from the encapsulation frame 12. As shown in FIGS. 2 to 4, during mounting, the fastening member 112 is pressed into the engaging hole 1241 by means of an elastic deformation ability of the fastening member 112 itself, so that the fastening member 112 is hooked in the engaging hole 1241. When the light group assembly 11 needs to be replaced, the fastening member 112 hooked in the engaging hole 1241 is pushed from the outside of the encapsulation frame 12, so that the fastening member 112 can be separated from the engaging hole 1241, and accordingly, the light group assembly 11 can be removed.

Further, as shown in FIGS. 1 and 8, when the side window encapsulation 10 is applied to a vehicle, a front side of the mounting opening 121 is a side where the vehicle head is located. The mounting groove 122 is located at a rear side of the mounting opening 121.

The second sidewall 1222 is located at a rear side rim of the encapsulation frame 12. As shown in FIGS. 2 to 4, the engaging hole 1241 extends through a rear surface of the encapsulation frame 12.

As shown in FIG. 2, when the side window encapsulation 10 is applied to the vehicle, the engaging hole 1241 is exposed outside a side enclosing sheet metal 30 and a drainage channel sheet metal 40 of the vehicle. Therefore, when replacing the light group assembly 11, it is not necessary to remove the encapsulation frame 12 and the glass 21 from the vehicle, thereby further improving maintenance convenience.

Further, in an embodiment, as shown in FIGS. 1, 2, 5, 6, 7, 11 and 12, the side window encapsulation 10 further includes a decorative member 13. The decorative member 13 is disposed outside the encapsulation frame 12. The decorative member 13 shields a side of the engaging hole 1241 facing away from the mounting opening 121. The decorative member 13 has a shielding effect on the engaging hole 1241, and improves the overall integrity of the appearance.

Further, when the side window encapsulation 10 is applied to the vehicle, as shown in FIG. 2, the drainage channel sheet metal 40 is disposed on the rear side of the side enclosing sheet metal 30. The decorative member 13 abuts against the drainage channel sheet metal 40 to shield the encapsulation frame 12. Moreover, the abutting between the decorative member 13 and the drainage channel sheet metal 40 also has a certain waterproof effect.

Figure 9:
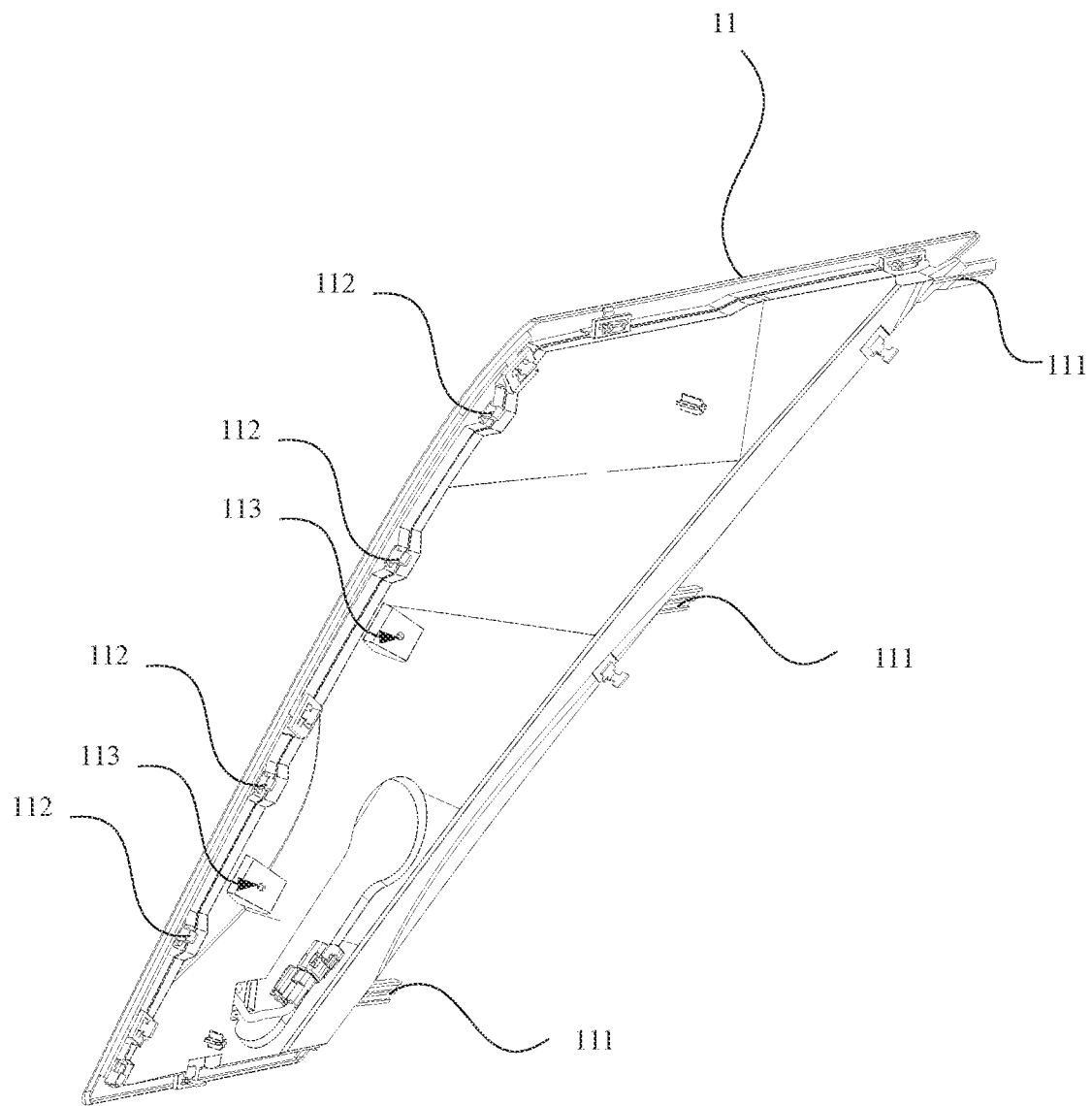
FIG. 9 is a schematic structural diagram of a light group assembly according to an embodiment.

Further, in an embodiment, as shown in FIG. 8, a plurality of insertion parts 123 are disposed on the first sidewall 1221. The plurality of insertion parts 123 are sequentially arranged at intervals in a length direction of the first sidewall 1221. As shown in FIG. 9, a plurality of insertion fitting parts 111 are provided on the light group assembly 11. The plurality of insertion fitting parts 111 are arranged in one-to-one correspondence with the insertion parts 123.

Further, as shown in FIG. 8, in an embodiment, a plurality of engaging parts 124 are disposed on the second sidewall 1222. The plurality of engaging parts 124 are sequentially arranged at intervals in a length direction of the second sidewall 1222.

Figure 7:
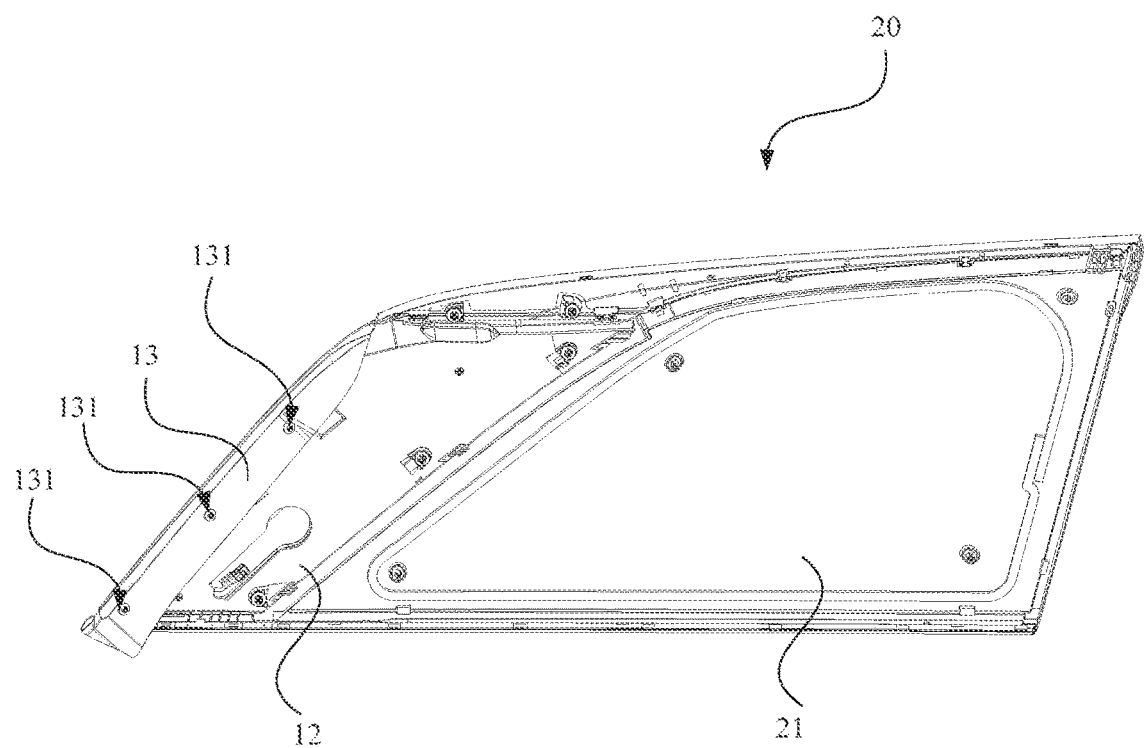
FIG. 7 is a rear view of a side window encapsulation assembly according to an embodiment.
Figure 11:
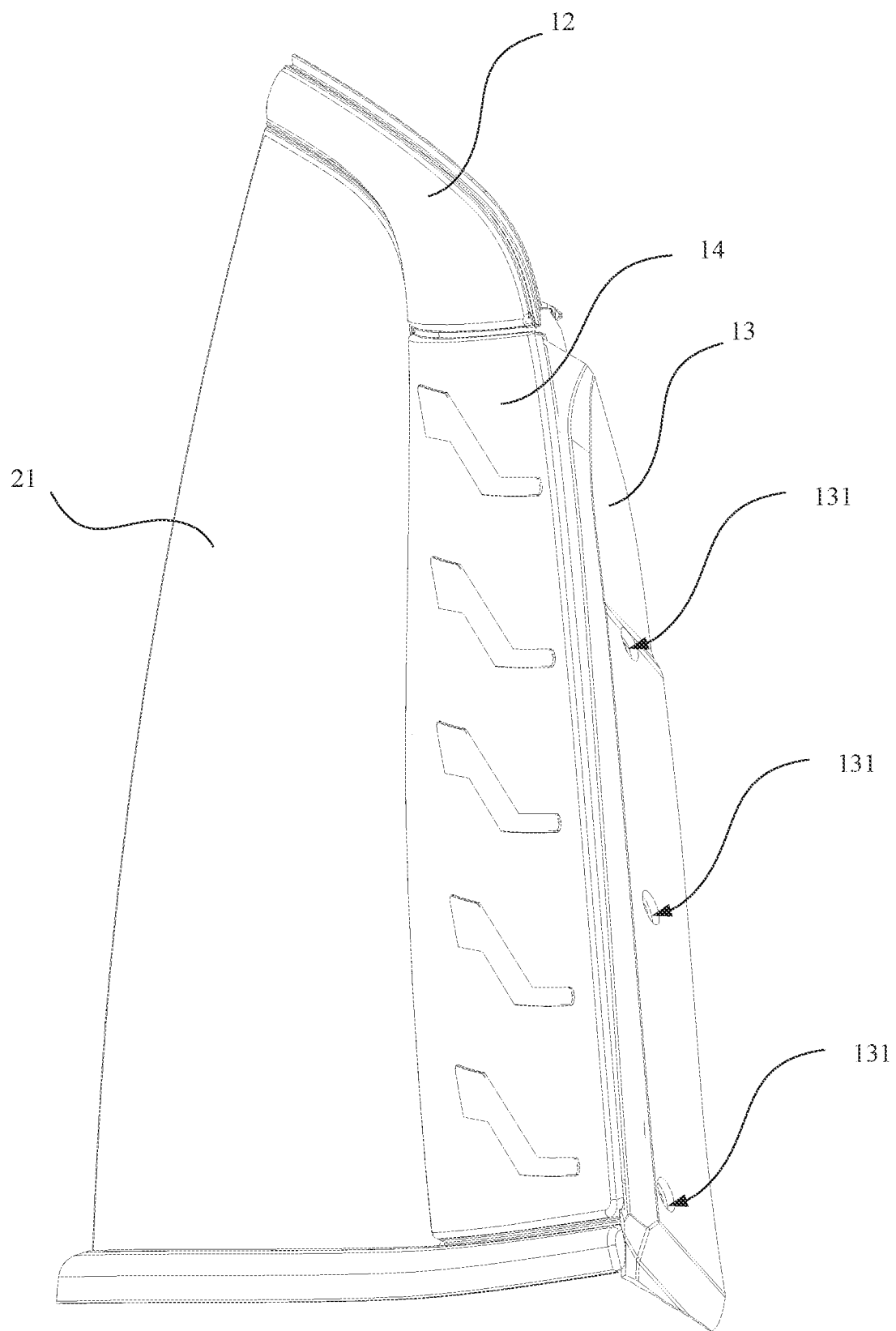
FIG. 11 is a partial enlarged view of a portion where a light group assembly and a decorative member in the side window encapsulation according to the embodiment.
Figure 12:
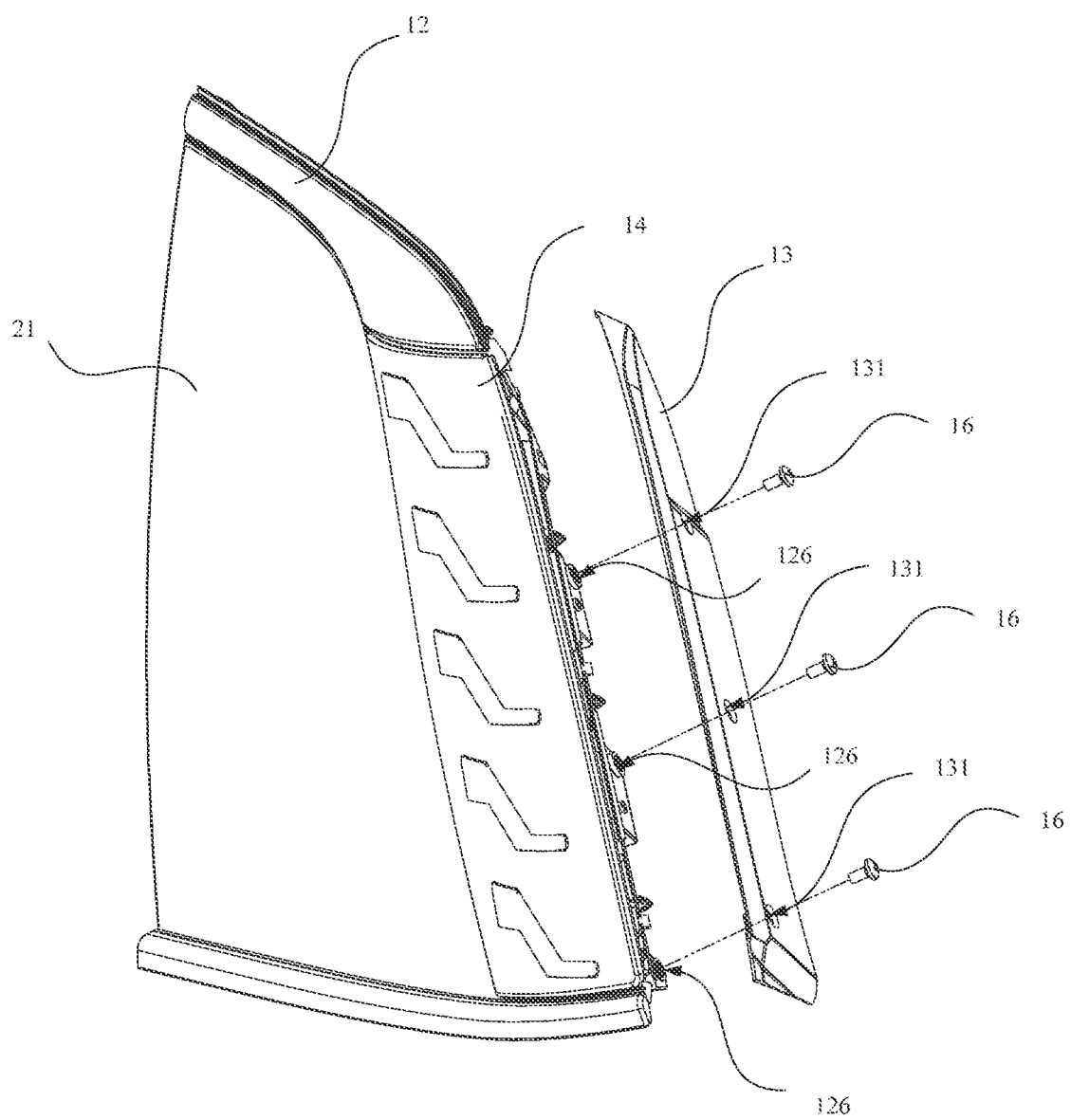
FIG. 12 is an exploded view of the structure shown in FIG. 11.

As shown in FIGS. 7, 11 and 12, the decorative member 13 is a strip plate. A length direction of the decorative member 13 is parallel to the length direction of the second sidewall 1222. The decorative member 13 shields the side of the engaging hole 1241 of each engaging part 124 facing away from the mounting opening 121. Under the shielding of the decorative member 13, the engaging hole 1241 cannot be seen from the outside. When the light group assembly 11 needs to be removed, the decorative member 13 can be removed firstly, so as to expose the engaging hole 1241 before the subsequent disassembling process.

Further, a process of mounting the glass 21 into the mounting opening 121 can include: firstly, placing the glass 21 and the encapsulation frame 12 into a molding die; and then injecting a flexible plastic material 17 between the glass 21 and the encapsulation frame 12 so that the glass 21 and the encapsulation frame 12 are formed into one piece.

As shown in FIGS. 2 and 3, the flexible plastic material 17 is disposed at an outer rim of the glass 21.

Further, in an embodiment, as shown in FIGS. 1, 11 and 12, the side window encapsulation 10 further includes a bright strip 14. The bright strip 14 is disposed on a side of the light group assembly 11 facing away from a bottom wall of the mounting groove 122. As shown in FIGS. 2, 3, 7, 11 and 12, one side of the two opposite sides of the bright strip 14 abuts against the flexible plastic material 17, another side of the two opposite sides of the bright strip 14 abuts against a long side of the decorative member 13. Another long side of the decorative member 13 is located on a side of the encapsulation frame 12 facing the interior of the vehicle.

Finally, as shown in FIGS. 11 and 12, the light group assembly 11 and the mounting groove 122 are completely shielded by the bright strip 14 and the decorative member 13.

The bright strip 14 and the light group assembly 11 may be adhered or engaged to each other, which is not specifically limited herein.

Further, as shown in FIGS. 1, 5 and FIGS. 8 to 10, in an embodiment, a first connecting through hole 125 is disposed on the second sidewall 1222, and a second connecting through hole 113 is further disposed at a portion of the light group assembly 11 corresponding to the first connecting through hole 125. The side window encapsulation 10 further includes a first connecting member 15. The first connecting member 15 extends through the first connecting through hole 125 and the second connecting through hole 113 to connect the light group assembly 11 and the encapsulation frame 12. The decorative member 13 shields a side of the first connecting member 15 facing away from the mounting opening 121.

The reliability of the connection between the light group assembly 11 and the encapsulation frame 12 is further improved by the first connecting member 15. Similarly, the first connecting member 15 is also shielded by the decorative member 13.

Further, as shown in FIGS. 6, 7, 11 and 12, in an embodiment, the side window encapsulation 10 further includes a second connecting member 16. A third connecting through hole 131 is disposed on the decorative member 13. A fourth connecting through hole (not shown in the figures) or a connecting groove 126 is disposed at a portion of the encapsulation frame 12 corresponding to the third connecting through hole 131. The second connecting member 16 extends through the third connecting through hole 131 and is inserted into the fourth connecting through hole or the connecting groove 126, thereby connecting the decorative member 13 and the encapsulation frame 12.

Figure 6:
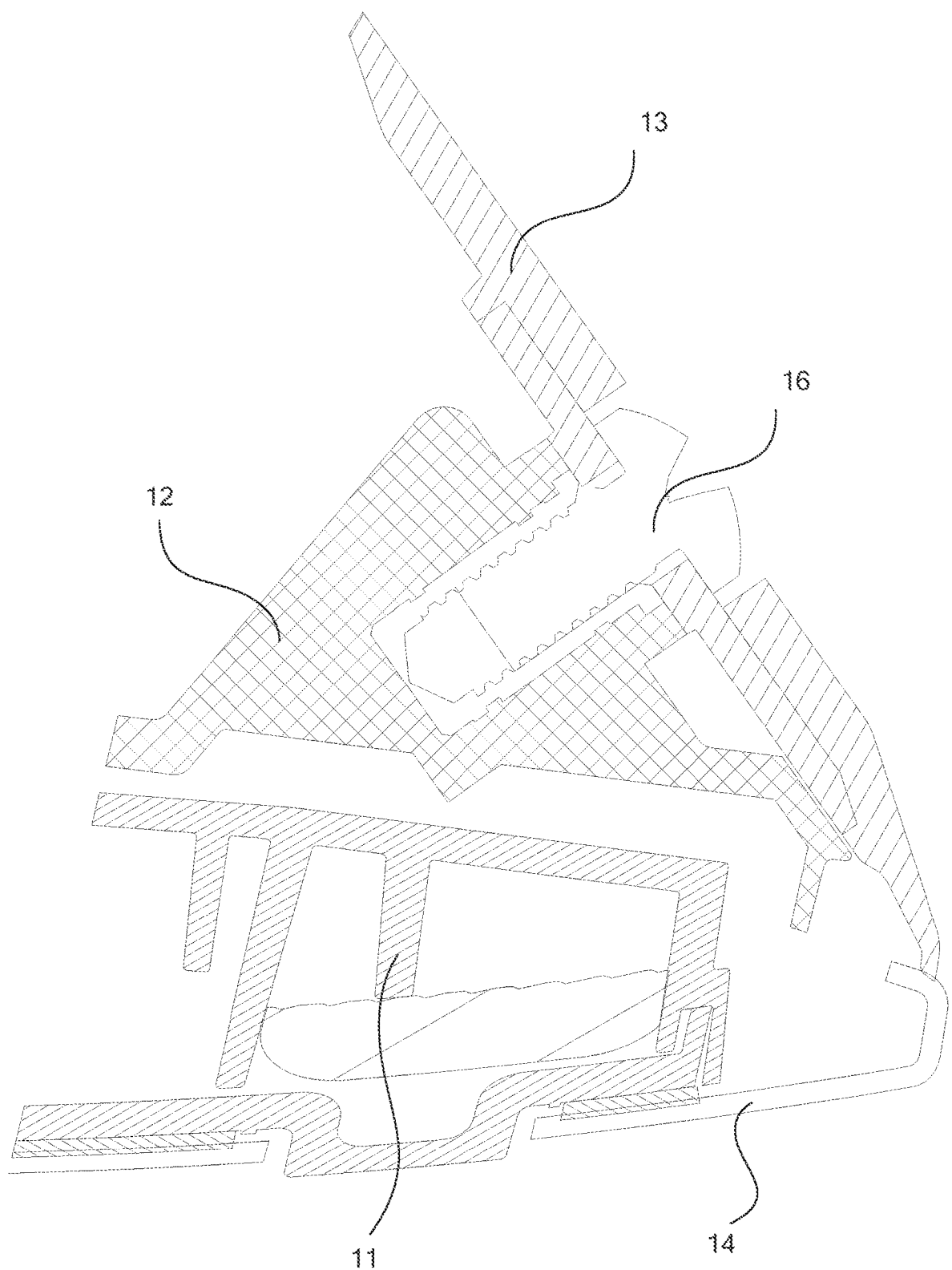
FIG. 6 is a sectional view taken along a line C-C in FIG. 1.

As shown in FIG. 6, when the decorative member 13 is connected to the encapsulation frame 12 through the second connecting member 16, one side edge of the bright strip 14 is pressed to a side adjacent to the mounting opening 121 by the decorative member 13.

In some embodiments, the first connecting member 15 can be a screw. Similarly, the second connecting member 16 can also be a screw. Alternatively, in other embodiments, the first connecting member 15 or the second connecting member 16 can be other components capable of realizing connection, and which is not specifically limited herein.

Further, in still another embodiment, as shown in FIGS. 1 and 2, there is provided a side window encapsulation assembly 20 including a glass 21 and the side window encapsulation 10 as described above. The glass 21 is mounted in the mounting opening 121.

The side window encapsulation assembly 20 according to this embodiment adopts the side window encapsulation 10 described in any of the above embodiments, so as to improve the operation convenience during replacement and maintenance of the light group assembly 11. In addition, the glass 21 can be kept intact in the maintenance process, thereby effectively reducing the maintenance cost.

In an embodiment, the glass 21 is integrally connected to the encapsulation frame 12.

The glass 21 and the encapsulation frame 12 can be placed in a molding die during processing, and then a flexible plastic material can be injected between the glass 21 and the encapsulation frame 12 so that the glass 21 and the encapsulation frame 12 are formed into one piece. The flexible plastic material can be thermoplastic elastomer (TPE), polyvinyl chloride (PVC), or polyurethane (PU).

Further, as shown in FIGS. 2 and 3, in an embodiment, a portion (i.e., the positioning protrusion 1111) of the insertion fitting part 111 inserted into the insertion part 123 is located on a side of the glass 21 facing the interior of the vehicle. The positioning protrusion 1111 is pressed against an inner side of the encapsulation frame 12.

Further, in yet another embodiment, a vehicle is provided, which includes the above-described side window encapsulation assembly 20.

The vehicle according to this embodiment adopts the side window encapsulation assembly 20 described in any of the above embodiments, so as to effectively improve the operation convenience during replacement and maintenance of the light group assembly 11 and reduce maintenance cost at the same time.

In the description of the present disclosure, it is to be understood that orientations or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientations or positional relationships shown in the drawings. These terms are only intended for facilitating illustrating the present disclosure and simplifying the illustration, rather than indicating or implying that the devices or elements referred thereto have to present particular orientations, and be constructed and operated in particular orientations, and therefore cannot be construed as limiting the present disclosure.

In addition, the terms "first" and "second" are only intended for illustrative purposes, rather than being construed as indicating or implying relative importance or implicitly designating the number of the technical features as indicated. Thus, the features defined by "first" and "second" may explicitly or implicitly include at least one of the features. In the illustrations of the present disclosure, the term "a plurality of" means at least two, for example two or three, unless otherwise explicitly and specifically defined.

In the present disclosure, unless otherwise expressly specified and defined, the terms "mounted", "connected to", "coupled" and "fixed" should be understood in a broad sense, for example, fixedly connected or removably connected, or integrated; mechanically connected or electrically connected; directly connected or indirectly connected through an intermediate medium, or in an interior communication or mutual interaction relationship between two elements, unless otherwise specifically defined. For those of ordinary skill in the art, the specific meanings of the above-described terms in the present disclosure may be understood according to specific circumstances.

In the present disclosure, unless otherwise expressly stated and defined, a first feature, when being referred to as being located "above" or "below" a second feature, may be in direct contact with the second feature, or in indirect contact with the second feature via an intermediate feature. Moreover, a first feature, when being referred to as being disposed "on", "above" and "over" a second feature, may be disposed right above or obliquely above the second feature, or simply disposed at a level higher than the second feature. A first feature, when being referred to as being disposed "under", "below" and "beneath" a second feature, may be disposed directly below or obliquely below the second feature, or simply disposed at a level lower than the second feature.

It should be noted that, when an element is referred to as being "fixed to" or "disposed on" another element, it may be directly on the other element or an intermediate element may also be present. When an element is referred to as being "connected" to another element, it may be directly connected to the other element or an intermediate element might be present at the same time. The terms "vertical", "horizontal", "up", "down", "left", "right" and similar expressions used herein are only for the purpose of illustration, rather than presenting the only ways for implementation.

The technical features of the embodiments above may be combined arbitrarily. To make the description concise, not all possible combinations of the technical features in the above embodiments are described. However, as long as there are no contradictions in the combinations of these technical features, all the combinations should be considered to be within the scope of the specification.

The embodiments above only represent several implementation modes of the present disclosure, and the description thereof is relatively specific and detailed, but it should not be construed as limiting the scope of the patent. It should be noted that for those skilled in the art, various modifications and improvements may be made without departing from the concept of the present disclosure, and all these modifications and improvements falls within the protection scope of the present disclosure. Therefore, the scope of protection of the patent disclosure should be subject to the appended claims.

The invention claimed is:

1. A side window encapsulation, comprising:
a light group assembly; and
an encapsulation frame, wherein the encapsulation frame encloses a mounting opening configured for receiving a glass; a side surface of the encapsulation frame facing away from an interior of a vehicle is an outer side surface; a mounting groove is disposed on the outer side surface of the encapsulation frame; the light group assembly is removably mounted in the mounting groove; and an insertion part and an engaging part are respectively disposed on two opposite sidewalls of the mounting groove;
wherein an insertion fitting part is disposed at a portion of the light group assembly corresponding to the insertion part, and one of the insertion fitting part and the insertion part is removably inserted in another one of the insertion fitting part and the insertion part; and
wherein a fastening member is disposed at a portion of the light group assembly corresponding to the engaging part; and the fastening member is removably engaged with the engaging part;
wherein a sidewall of the mounting groove provided with the insertion part is a first sidewall and a sidewall of the mounting groove provided with the engaging part is a second sidewall; the first sidewall and the second sidewall are arranged sequentially in a direction away from the mounting opening; the second sidewall is located at an outer rim of the encapsulation frame; the engaging part comprises an engaging hole disposed on the second sidewall; the fastening member is removably engaged in the engaging hole; and the engaging hole extends through the encapsulation frame in the direction away from the mounting opening.

2. The side window encapsulation according to claim 1, wherein when applied to a vehicle, a front side of the mounting opening is a side where a vehicle head is located; and the mounting groove is located at a rear side of the mounting opening.

3. The side window encapsulation according to claim 1, wherein the side window encapsulation further comprises a decorative member, wherein the decorative member is disposed outside the encapsulation frame; and the decorative member shields a side of the engaging hole facing away from the mounting opening.

4. The side window encapsulation according to claim 3, wherein a plurality of insertion parts are disposed on the first sidewall; and the plurality of insertion parts are arranged at intervals in a length direction of the first sidewall; and wherein a plurality of engaging holes are disposed on the second sidewall; the plurality of engaging holes are arranged at intervals in a length direction of the second sidewall; the decorative member is a strip plate; a length direction of the decorative member is parallel to the length direction of the second sidewall; and the decorative member shields a side of each of the engaging holes facing away from the mounting opening.

5. The side window encapsulation according to claim 4, wherein the encapsulation frame is capable of being integrally connected with the glass by an injection of a flexible plastic material; the side window encapsulation further comprises a bright strip disposed on a side of the light group assembly facing away from a bottom wall of the mounting groove; one side edge of two opposite side edges of the bright strip abuts against the flexible plastic material, another side edge of the two opposite side edges of the bright strip abuts against a long edge of the decorative member, and another long edge of the decorative member is located on a side of the encapsulation frame facing the interior of the vehicle.

6. The side window encapsulation according to claim 5, wherein the bright strip is adhered or engaged to the light group assembly.

7. The side window encapsulation according to claim 3, wherein a first connecting through hole is disposed on the second sidewall; a second connecting through hole is formed at a portion of the light group assembly corresponding to the first connecting through hole; the side window encapsulation further comprises a first connecting member, and wherein the first connecting member extends through the first connecting through hole and the second connecting through hole to connect the light group assembly and the encapsulation frame; and the decorative member shields a side of the first connecting member facing away from the mounting opening.

8. The side window encapsulation according to claim 7, further comprising: a second connecting member, wherein a third connecting through hole is disposed on the decorative member; a fourth connecting through hole or a connecting groove is disposed at a portion of the encapsulation frame corresponding to the third connecting through hole; and the second connecting member extends through the third connecting through hole and is inserted into the fourth connecting through hole or the connecting groove to connect the decorative member and the encapsulation frame.

9. A side window encapsulation assembly, comprising:
a glass; and
the side window encapsulation according to claim 1,
wherein the glass is mounted in the mounting opening.

10. The side window encapsulation assembly according to claim 9, wherein the glass is integrally connected with the encapsulation frame.

11. The side window encapsulation assembly according to claim 9, wherein the insertion part comprises an inserting hole disposed on a sidewall of the mounting groove; the insertion fitting part comprises a positioning protrusion disposed on the light group assembly; wherein the positioning protrusion is removably inserted into the inserting hole; and a portion of the positioning protrusion inserted into the inserting hole is located on a side of the glass facing the interior of the vehicle.

12. The side window encapsulation assembly according to claim 9, wherein the insertion part comprises a convex structure disposed on a sidewall of the mounting groove; the insertion fitting part comprises a concave structure disposed on the light group assembly; and the convex structure is removably inserted into the concave structure.

13. A vehicle, comprising the side window encapsulation assembly according to claim 9.

* * * * *